United States Patent
Le et al.

(10) Patent No.: US 11,434,365 B2
(45) Date of Patent: Sep. 6, 2022

(54) USE OF A SULFONATED POLYARYL ETHER KETONE OR OF A SULFONATED NON-POLYMERIC ARYL ETHER KETONE AS A DISPERSANT

(71) Applicant: ARKEMA FRANCE, Colombes (FR)

(72) Inventors: Guillaume Le, Herouville Saint Clair (FR); Fabien Sguerra, Saint Laurent du Var (FR); Julien Jouanneau, Bryn Mawr, PA (US)

(73) Assignee: ARKEMA FRANCE, Colombes (FR)

( * ) Notice: Subject to any disclaimer, the term of this patent is extended or adjusted under 35 U.S.C. 154(b) by 65 days.

(21) Appl. No.: 16/763,725

(22) PCT Filed: Nov. 12, 2018

(86) PCT No.: PCT/FR2018/052806
§ 371 (c)(1),
(2) Date: May 13, 2020

(87) PCT Pub. No.: WO2019/097148
PCT Pub. Date: May 23, 2019

(65) Prior Publication Data
US 2021/0363346 A1 Nov. 25, 2021

(30) Foreign Application Priority Data
Nov. 14, 2017 (FR) ...................... 1760709

(51) Int. Cl.
| C08L 71/00 | (2006.01) |
| C08J 5/24 | (2006.01) |
| C08L 71/08 | (2006.01) |
| D06M 15/53 | (2006.01) |
| D06M 15/63 | (2006.01) |
| D06M 15/705 | (2006.01) |
| D06M 101/40 | (2006.01) |

(52) U.S. Cl.
CPC ............... *C08L 71/00* (2013.01); *C08J 5/243* (2021.05); *C08L 71/08* (2013.01); *D06M 15/53* (2013.01); *D06M 15/63* (2013.01); *D06M 15/705* (2013.01); *C08J 2371/08* (2013.01); *C08J 2471/08* (2013.01); *C08L 2201/54* (2013.01); *C08L 2205/025* (2013.01); *D06M 2101/40* (2013.01)

(58) Field of Classification Search
CPC .......... C08L 73/00; C08L 71/00; C08L 71/08; C09D 173/00; C09D 171/00; C09D 171/08; C09J 173/00; C09J 171/00; C09J 171/08; C08J 2373/00; C08J 2371/00; C08J 2371/08; D06M 15/53; C08G 65/4012
See application file for complete search history.

(56) References Cited

U.S. PATENT DOCUMENTS

2004/0131910 A1 7/2004 Bauer
2015/0274588 A1 10/2015 Defelice et al.

FOREIGN PATENT DOCUMENTS

| CN | 105524412 A | * | 4/2016 |
| CN | 107652829 A | * | 2/2018 |
| EP | 2911807 B1 | | 9/2015 |
| WO | 2016156325 A1 | | 10/2016 |

OTHER PUBLICATIONS

International Search Report (with English Translation) and Written Opinion issued in corresponding International Patent Application No. PCT/FR2018/052806, 10 pages (dated Feb. 20, 2019).

* cited by examiner

*Primary Examiner* — Kregg T Brooks
(74) *Attorney, Agent, or Firm* — Buchanan Ingersoll & Rooney P.C.

(57) ABSTRACT

The use of a sulfonated polyaryl ether ketone or of a sulfonated non-polymeric aryl ether ketone as a dispersant for a polyaryl ether ketone resin powder in an aqueous solution, and also to a corresponding composition, and to a process for preparing a semifinished product comprising a polyaryl ether ketone resin and reinforcing fibers.

30 Claims, No Drawings

USE OF A SULFONATED POLYARYL ETHER KETONE OR OF A SULFONATED NON-POLYMERIC ARYL ETHER KETONE AS A DISPERSANT

FIELD OF THE INVENTION

The present invention relates to the use of a sulfonated polyaryl ether ketone or of a sulfonated non-polymeric aryl ether ketone as a dispersant for polyaryl ether ketone resin powders, notably in the manufacture of semifinished products including a polyaryl ether ketone resin and reinforcing fibers.

TECHNICAL BACKGROUND

Composite materials combining a thermoplastic resin with reinforcing fibers are, due to their excellent mechanical properties for a low weight, of great interest in numerous fields, notably in the aeronautical and space industry, but also in the motor vehicle industry and the sports equipment industry.

These composite materials are generally manufactured by consolidation of semifinished products consisting of resin-coated reinforcing fibers, such as prepregs in the form of unidirectional sheets, of rovings or of woven fabrics.

These semifinished products can be obtained by impregnating the fibers with the resin. Various processes exist in which the resin can be molten, dissolved in a solvent, or else in powder form, either in a fluidized bed or dispersed in an aqueous solution. The impregnated fibers are subsequently, where appropriate, stripped of the solvent or of the aqueous solution and then heated in order to melt the retained resin and to form the semifinished product.

For polymers with a high melting point, such as polyaryl ether ketones (PAEK), impregnation by passing through a bath of aqueous dispersion is economically and environmentally advantageous. With this technique, it is important to ensure homogeneous distribution of the resin particles during the impregnation of the fibers.

It is known practice to include dispersants or surfactants into the aqueous dispersion in order to permit dispersion and to promote this homogeneous distribution, whether with or without stirring. These agents are often composed of a hydrophobic part (fatty chain, aromatic group) and of a hydrophilic part (ethoxylated chain or ionic group). Ethoxylated chains, in particular such as polyethylene glycol chains, have low thermal stability.

In the presence of oxygen, they become oxidized and form radicals at and above 200-250° C. Under an inert atmosphere, they undergo thermolysis at and above 350-370° C. The radicals generated by these spurious reactions lead to the degradation of the polymer (branching reactions, presence of insoluble matter, lowering of the crystallization temperature, etc.), disrupting the subsequent steps for manufacturing the composite and inducing unsatisfactory properties.

Moreover, US 2015/274588A describes the use of sulfonated PAEK for fiber sizing. The sulfonated PAEK is dissolved in hot water and then coated onto fibers. The fibers are subjected to a heat treatment to be dried, and then to desulfonate the PAEK.

US 2004/0131910 describes methods for sulfonating polyether ketone ketone (PEKK) with hot fuming sulfuric acid or with chlorosulfuric acid at room temperature.

There is a need to provide homogeneous aqueous dispersions of PAEK for the impregnation of reinforcing fibers, while at the same time avoiding the deterioration of the thermal stability of the PAEK.

SUMMARY OF THE INVENTION

The invention relates firstly to the use of a sulfonated polyaryl ether ketone or of a sulfonated non-polymeric aryl ether ketone as a dispersant for a polyaryl ether ketone resin powder in an aqueous solution.

In certain embodiments, the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same, the polyaryl ether ketone preferably being a polyether ketone ketone (PEKK) or a polyether ether ketone (PEEK).

In certain embodiments, the sulfonated polyaryl ether ketone is chosen from the group consisting of sulfonated polyether ketones (PEK), sulfonated polyether ether ketones (PEEK), sulfonated polyether ether ketone ketones (PEEKK), sulfonated polyether ketone ketones (PEKK), sulfonated polyether ketone ether ketone ketones (PEKEKK), sulfonated polyether ether ketone ether ketones (PEEKEK), sulfonated polyether ether ether ketones (PEEEK), sulfonated polyether diphenyl ether ketones (PEDEK), mixtures thereof and copolymers comprising same.

In certain embodiments, the sulfonated non-polymeric aryl ether ketone is sulfonated 1,4-bis(4-phenoxybenzoyl)benzene.

In certain embodiments, the sulfonated polyaryl ether ketone or the sulfonated non-polymeric aryl ether ketone has a degree of sulfonation of from 0.01 to 4, preferably from 0.01 to 1 and more preferably from 0.01 to 0.1.

In certain embodiments, the sulfonated polyaryl ether ketone or the sulfonated non-polymeric aryl ether ketone includes sulfonated groups chosen from sulfonic acid groups and/or sulfonate groups, the molar proportion of sulfonate groups in the sulfonated polyaryl ether ketone or, respectively, in the sulfonated non-polymeric aryl ether ketone, relative to the total amount of sulfonated groups, preferably being greater than or equal to 50%, more preferably greater than or equal to 80%.

The invention also relates to a composition comprising a polyaryl ether ketone resin powder suspended in an aqueous solution, the composition also comprising a sulfonated polyaryl ether ketone or a sulfonated non-polymeric aryl ether ketone.

In certain embodiments, the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same, the polyaryl ether ketone preferably being a polyether ketone ketone (PEKK) or a polyether ether ketone (PEEK).

In certain embodiments, the sulfonated polyaryl ether ketone is chosen from the group consisting of sulfonated polyether ketones (PEK), sulfonated polyether ether ketones (PEEK), sulfonated polyether ether ketone ketones (PEEKK), sulfonated polyether ketone ketones (PEKK), sulfonated polyether ketone ether ketone ketones (PEKEKK), sulfonated polyether ether ketone ether ketones (PEEKEK), sulfonated polyether ether ether ketones (PEEEK), sulfonated polyether diphenyl ether ketones (PEDEK), mixtures thereof and copolymers comprising same. Sulfonated polyether ketone ketones (PEKK) and sulfonated polyether ether ketones (PEEK) are particularly preferred.

In certain embodiments, the sulfonated non-polymeric aryl ether ketone is sulfonated 1,4-bis(4-phenoxybenzoyl)benzene.

In certain embodiments, the sulfonated polyaryl ether ketone or the sulfonated non-polymeric aryl ether ketone has a degree of sulfonation of from 0.01 to 4, preferably from 0.1 to 1 and more preferably from 0.1 to 0.5.

In certain embodiments, the sulfonated polyaryl ether ketone or the sulfonated non-polymeric aryl ether ketone includes sulfonated groups chosen from sulfonic acid groups and/or sulfonate groups, the molar proportion of sulfonate groups in the sulfonated polyaryl ether ketone or, respectively, in the sulfonated non-polymeric aryl ether ketone, relative to the total amount of sulfonated groups, preferably being greater than or equal to 50%, preferably greater than or equal to 80%.

In certain embodiments, the mass content of sulfonated polyaryl ether ketone or of sulfonated non-polymeric aryl ether ketone, relative to the polyaryl ether ketone resin powder, is from 0.1% to 20%, advantageously from 0.2% to 10%, preferably from 0.5% to 5% and most particularly from 1% to 3%.

The invention also relates to a process for preparing a semifinished product comprising a polyaryl ether ketone resin and reinforcing fibers, comprising:
- the provision of a composition as described above, and the impregnation of reinforcing fibers with this composition;
- drying of the impregnated reinforcing fibers;
- heating of the impregnated reinforcing fibers so as to melt the polyaryl ether ketone; and
- optionally, a calendering step.

In certain embodiments, the reinforcing fibers are carbon fibers.

In certain embodiments, the semifinished product is chosen from a prepreg or a tape.

The invention also relates to a semifinished product which may be prepared according to the process described above.

The invention also relates to the use of a semifinished product as described above for the manufacture of composite materials.

The present invention makes it possible to overcome the drawbacks of the prior art. It more particularly provides a means for dispersing (placing in suspension) a PAEK powder in an aqueous solution homogeneously, while at the same time avoiding the deterioration of the thermal stability of the PAEK.

This is accomplished by means of the use of a sulfonated PAEK or of a sulfonated non-polymeric aryl ether ketone as a dispersant.

The invention may make it possible to dispense with the use of conventional surfactants that are insufficiently heat-stable.

The invention may be performed with a relatively small amount of sulfonated compound, which makes it possible to limit the porosity problems inherent in this type of compound. Specifically, despite having a high thermal stability, these compounds may become desulfonated under the implementation conditions, which may give rise to volatile matter and as a result increase the porosity.

The invention can make it possible to avoid the use of fiber sizing, the sulfonated PAEK making it possible to promote the bonding between the reinforcing fibers and the PAEK matrix.

DESCRIPTION OF EMBODIMENTS OF THE INVENTION

The invention is now described in greater detail and in a nonlimiting manner in the description that follows.

The invention relates to the use of a sulfonated PAEK or of a sulfonated non-polymeric aryl ether ketone as a dispersant for a PAEK resin powder in aqueous medium.

PAEK Resin

The term "resin" means a composition predominantly comprising one or more polymers additivated, where appropriate, with additives such as fillers and functional additives.

The term "PAEK" means polymers including units of formula (—Ar—X—) and also units of formula (—Ar'—Y—), in which:
- Ar and Ar' each denote a divalent aromatic radical;
- Ar and Ar' may preferably be chosen from 1,3-phenylene, 1,4-phenylene, 4,4'-biphenylene, 1,4-naphthylene, 1,5-naphthylene and 2,6-naphthylene, which are optionally substituted;
- X denotes an electron-withdrawing group, which may preferably be chosen from a carbonyl group and a sulfonyl group;
- Y denotes a group chosen from an oxygen atom, a sulfur atom, an alkylene group, notably such as —$CH_2$— and isopropylidene.

Among the units X, at least 50 mol %, preferably at least 70 mol % and more particularly at least 80 mol % of the units X represent a carbonyl group.

In certain embodiments, all the units X denote a carbonyl group.

Among the units Y, at least 50 mol %, preferably at least 70 mol % and more particularly at least 80 mol % of the units Y represent an oxygen atom. In certain embodiments, all the units Y denote an oxygen atom.

Thus, in certain embodiments, the PAEK is a polymer including, or preferably consisting of, units of formula (—Ar—CO—) and also units of formula (—Ar'—O—), the units Ar and Ar' being as defined above.

In certain embodiments, the PAEK is a polyether ketone ketone (PEKK), including a succession of repeated units of the type —($Ar_1$—O—$Ar_2$—CO—$Ar_3$—CO)$_n$—, each $Ar_1$, $Ar_2$ and $Ar_3$ independently representing a divalent aromatic radical, preferably a phenylene.

In the above formula, just as in all of the formulae which follow, n represents an integer.

The bonds on either side of each unit $Ar_1$, $Ar_2$ and $Ar_3$ may be of para or meta or ortho type (preferably of para or meta type).

In certain embodiments, the PEKK includes a succession of repeated units of formula (IA) and/or of formula (IB) below:

(IA)

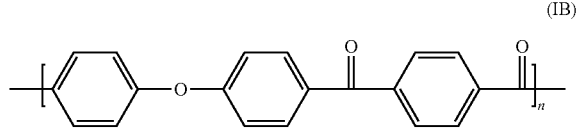

The units of formula (IA) are units derived from isophthalic acid (or I units), whereas the units of formula (IB) are units derived from terephthalic acid (or T units).

In the PEKK used in the invention, the weight proportion of T units, relative to the sum of the T and I units, may range from 0% to 5%; or from 5% to 10%; or from 10% to 15%; or from 15% to 20%; or from 15% to 20%; or from 20% to 25%; or from 25% to 30%; or from 30% to 35%; or from 35% to 40%; or from 40% to 45%; or from 45% to 50%; or from 50% to 55%; or from 55% to 60%; or from 60% to 65%; or from 65% to 70%; or from 70% to 75%; or from 75% to 80%; or from 80% to 85%; or from 85% to 90%; or from 90% to 95%; or from 95% to 100%.

Ranges of from 35% to 100%, notably from 55% to 85% and even more specifically from 60% to 80% are particularly suitable. In all the ranges set out in the present patent application, the limits are included, unless otherwise mentioned.

In certain embodiments, the PAEK is a polyether ether ketone (PEEK), including a succession of repeated units of the type —$(Ar_1$—O—$Ar_2$—O—$Ar_3$—CO$)_n$—, each $Ar_1$, $Ar_2$ and $Ar_3$ independently representing a divalent aromatic radical, preferably a phenylene.

The bonds on either side of each unit $Ar_1$, $Ar_2$ and $Ar_3$ may be of para or meta or ortho type (preferably of para or meta type).

In certain embodiments, the PEEK includes a succession of repeated units of formula (II):

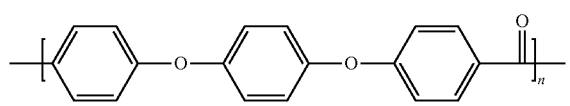

and/or a succession of repeated units of formula (III):

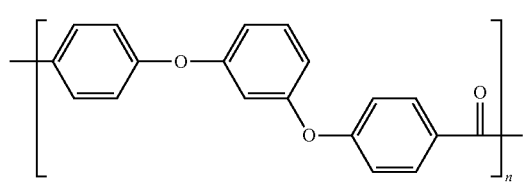

and/or a succession of repeated units of formula (IV):

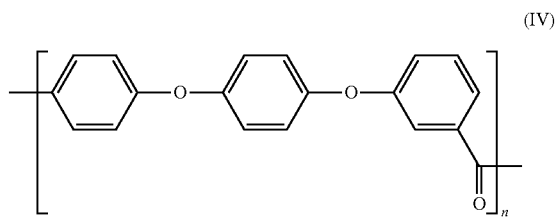

and/or a succession of repeated units of formula (V):

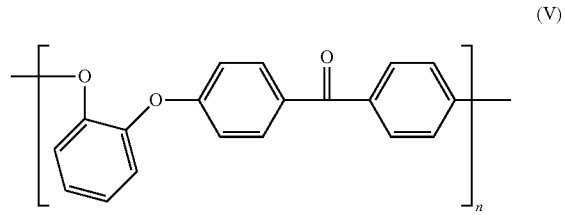

In certain embodiments, the PAEK is a polyether ketone (PEK), including a succession of repeated units of the type —$(Ar_1$—O—$Ar_2$—CO$)_n$—, each $Ar_1$ and $Ar_2$ independently representing a divalent aromatic radical, preferably a phenylene.

The bonds on either side of each unit $Ar_1$ and $Ar_2$ may be of para or meta or ortho type (preferably of para or meta type).

In certain embodiments, the PEK includes a succession of repeated units of formula (VI):

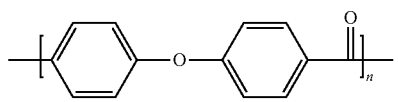

In certain embodiments, the PEK includes a succession of repeated units of formula (VII):

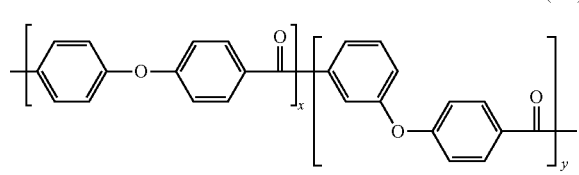

In this formula, just as in the following formulae, x and y represent integers.

In certain embodiments, the PEK includes a succession of repeated units of formula (VIII):

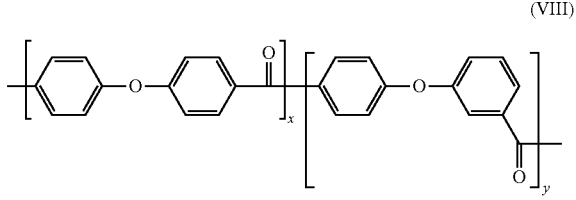

(VIII)

In certain embodiments, the PAEK is a polyether ether ketone ketone (PEEKK), including a succession of repeated units of the type —($Ar_1$—O—$Ar_2$—O—$Ar_3$—CO—$Ar_4$—CO)$_n$—, each $Ar_1$, $Ar_2$, $Ar_3$ and $Ar_4$ independently representing a divalent aromatic radical, preferably a phenylene.

The bonds on either side of each unit $Ar_1$, $Ar_2$, $Ar_3$ and $Ar_4$ may be of para or meta or ortho type (preferably of para or meta type).

In certain embodiments, the PEEKK includes a succession of repeated units of formula (IX):

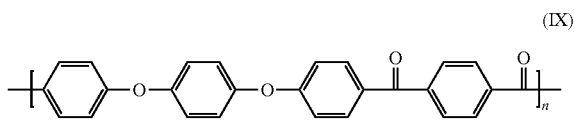

(IX)

In certain embodiments, the PAEK is a polyether ether ether ketone (PEEEK), including a succession of repeated units of the type —($Ar_1$—O—$Ar_2$—O—$Ar_3$—O—$Ar_4$—CO)$_n$—, each $Ar_1$, $Ar_2$, $Ar_3$ and $Ar_4$ independently representing a divalent aromatic radical, preferably a phenylene.

The bonds on either side of each unit $Ar_1$, $Ar_2$, $Ar_3$ and $Ar_4$ may be of para or meta or ortho type (preferably of para or meta type).

In certain embodiments, the PEEEK includes a succession of repeated units of formula (X):

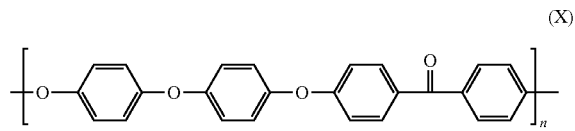

(X)

In certain embodiments, the PAEK is a polyether ketone ether ketone ketone (PEKEKK), including a succession of repeated units of the type —($Ar_1$—O—$Ar_2$—CO—$Ar_3$—O—$Ar_4$—CO—$Ar_5$—CO)$_n$—, each $Ar_1$, $Ar_2$, $Ar_3$, $Ar_4$ and $Ar_5$ independently representing a divalent aromatic radical, preferably a phenylene.

The bonds on either side of each unit $Ar_1$, $Ar_2$, $Ar_3$, $Ar_4$ and $Ar_5$ may be of para or meta or ortho type (preferably of para or meta type).

In certain embodiments, the PAEK is a polyether ether ketone ether ketone (PEEKEK), including a succession of repeated units of the type —($Ar_1$—O—$Ar_2$—O—$Ar_3$—CO—$Ar_4$—O—$Ar_5$—CO)$_n$—, each $Ar_1$, $Ar_2$, $Ar_3$, $Ar_4$ and $Ar_5$ independently representing a divalent aromatic radical, preferably a phenylene.

The bonds on either side of each unit $Ar_1$, $Ar_2$, $Ar_3$, $Ar_4$ and $Ar_5$ may be of para or meta or ortho type (preferably of para or meta type).

In certain embodiments, the PAEK is according to the most general formula indicated below, in which certain units Ar and/or Ar' represent a divalent radical derived from diphenyl or from biphenol.

In certain embodiments, the PAEK is a polyether diphenyl ether ketone (PEDEK), including a succession of repeated units of the type —($Ar_1$—O-D-O—$Ar_2$—CO)$_n$—, each $Ar_1$ and $Ar_2$ independently representing a divalent aromatic radical, preferably a phenylene, and D representing a divalent radical derived from diphenyl.

The bonds on either side of each unit $Ar_1$ and $Ar_2$ may be of para or meta or ortho type (preferably of para or meta type).

In certain embodiments, the PEDEK includes a succession of repeated units of formula (XI):

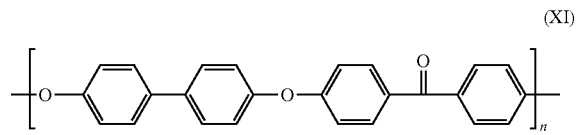

(XI)

Mixtures of the preceding PAEKs may also be used, as may copolymers of the preceding PAEKs.

PEEK and PEKK and also mixtures thereof are particularly preferred.

The PAEK resin may comprise one or more additional polymers not belonging to the PAEK family.

Preferably, the mass content of PAEK in the PAEK resin is greater than or equal to 50%, preferably 60%, more preferably 70%, more preferably 80% and more preferably 90%.

In certain embodiments, the PAEK resin consists essentially of one or more PAEKs.

In certain embodiments, the PAEK resin comprises PEKK, the mass content of PEKK in the PAEK resin being greater than or equal to 50%, preferably 60%, more preferably 70%, more preferably 80% and more preferably 90%.

In certain embodiments, the PAEK resin consists essentially of PEKK.

The resin may comprise one or more phosphates or phosphate salts, to improve the melt stability of the PAEK.

The resin may comprise additives such as fillers and functional additives. It is also possible to dispense with fillers and/or to dispense with functional additives.

Non-Polymeric Aryl Ether Ketone

The term "non-polymeric aryl ether ketone" means a molecule including at least one residue of formula: (—Ar—O—) and also at least one residue of formula: (—Ar'—C(O)—), in which:

Ar and Ar' each denote a divalent aromatic radical; and
Ar and Ar' may preferably be chosen, independently, from 1,3-phenylene, 1,4-phenylene, 4,4'-biphenylene, 1,4-naphthylene, 1,5-naphthylene and 2,6-naphthylene, which are optionally substituted; said molecule being non-polymeric, i.e. not comprising any repeating units.

In certain embodiments, Ar and Ar' independently represent a phenylene radical.

The bonds on either side of Ar and Ar' may be, independently, of para, meta or ortho type. Preferably, the bonds on either side of Ar and Ar' may be, independently, of para or meta type.

In certain embodiments, the non-polymeric aryl ether ketone may notably be a molecule including at least one residue of formula: (—O—$Ar_1$—C(O)—), in which:

$Ar_1$ denotes a divalent aromatic radical; and
$Ar_1$ may preferably be chosen from 1,3-phenylene, 1,4-phenylene, 4,4'-biphenylene, 1,4-naphthylene, 1,5-naphthylene and 2,6-naphthylene, which are optionally substituted; and said molecule being non-polymeric, i.e. not comprising any repeating units.

In certain embodiments, $Ar_1$ represents a phenylene radical.

The bonds on either side of An may be of para, meta or ortho type. Preferably, the bonds on either side of An may be of para type or of meta type.

In particular, the sulfonated groups may be present as hydrogen atom substituents on one or more units Ar and Ar' as described above.

Preferably, the sulfonated groups are present on one or more units Ar and Ar' bonded to an ether unit —O—.

An example of a sulfonated PAEK is the sulfonated PEKK of general formula (XIII):

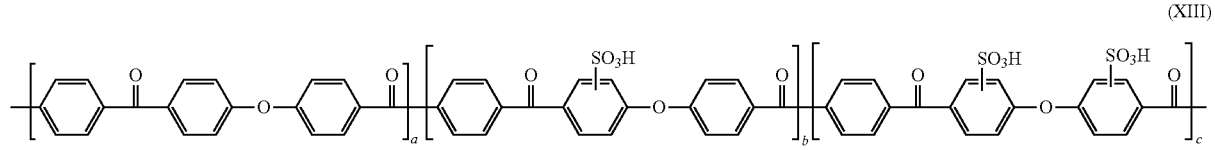

(XIII)

In certain embodiments, the non-polymeric aryl ether ketone may notably be a molecule of formula:

$Ar_0$—O—$Ar_1$—C(O)—$Ar_2$—C(O)—$Ar_3$—O—$Ar_4$, in which:

$Ar_0$ and $Ar_4$ each represent a monovalent aromatic radical, preferably chosen independently from phenyl and naphthyl;

$Ar_1$, $Ar_2$ and $Ar_3$ each represent a divalent aromatic radical preferably chosen independently from 1,3-phenylene, 1,4-phenylene, 4,4'-biphenylene, 1,4-naphthylene, 1,5-naphthylene and 2,6-naphthylene, which are optionally substituted.

In certain embodiments, $Ar_0$ and $Ar_4$ represent a phenyl radical and An, $Ar_2$ and $Ar_3$ each represent a phenylene radical.

The bonds on either side of $Ar_1$, $Ar_2$ and $Ar_3$ may be of para, meta or ortho type. Preferably, the bonds on either side of $Ar_1$, $Ar_2$ and $Ar_3$ may be of para type or of meta type.

In one particular embodiment, the non-polymeric aryl ether ketone is 1,4-bis(4-phenoxybenzoyl)benzene.

Sulfonated PAEK and Non-Polymeric Aryl Ether Ketone

The term "sulfonated" means that the PAEK or the non-polymeric aryl ether ketone includes as substituent(s) at least one group which is denoted herein as a "sulfonated group", i.e. a sulfonic acid group of formula —$SO_3H$ or a sulfonate group of formula $SO_3M$ where $M^+$ represents a monovalent cation. Preferably, M represents the sodium cation (Na) or the potassium cation (K).

All of the description of the PAEKs given above with regard to the resin similarly applies to the sulfonated PAEK.

All of the description of the non-polymeric aryl ether ketones given above similarly applies to the sulfonated non-polymeric aryl ether ketones.

In particular embodiments, the sulfonated PAEK may be a sulfonated PEEK (as described above) or a sulfonated PEKK (as described above).

The sulfonated PAEK comprises a number of repeating units of greater than or equal to 2, preferably greater than or equal to 10, more preferably greater than or equal to 100.

The number-average molecular mass of the sulfonated PAEK is preferably from 1500 to 30 000 g/mol, more preferably from 5000 to 20 000 g/mol and more preferably from 10 000 to 20 000 g/mol. Using a polymer with a target molar mass makes it possible to modulate the viscosity of the dispersion so as to limit, for example, the sedimentation or to facilitate the entrainment of the powder by the fibers.

In the sulfonated PAEK, the sulfonated groups may be present as hydrogen atom substituents in any position of the molecule.

in which a, b and c each independently represent 0 or an integer. It is understood that, in the preceding formula, the sulfonic acid groups may also be totally or partly replaced with sulfonate groups.

The sulfonated PAEK may be prepared by sulfonation of the corresponding PAEK or by polymerization of sulfonated monomers, or mixtures of sulfonated and non-sulfonated monomers. The sulfonation reaction of the PAEK may be performed, for example, by placing the PAEK in contact with fuming sulfuric acid ($H_2SO_4+SO_3$). The temperature at which the reaction is performed may notably be from 20 to 90° C., preferably from 20 to 60° C. The reaction time may notably be from 0.5 to 24 hours, preferably from 1 to 8 hours. The PAEK concentration in the acid is preferably from 1% to 40%, more preferably from 5% to 35% and more preferably from 10% to 30% (by mass).

Alternatively, the sulfonation reaction may be performed under milder conditions, by reacting the PAEK in chlorosulfonic acid ($ClSO_3H$). The temperature at which the reaction is performed may notably be from 0° C. to 50° C., preferably from 10 to 25° C. The reaction time may notably be from 1 hour to 12 hours, preferably from 2 hours to 10 hours. The PAEK concentration in the acid is preferably from 1% to 40%, more preferably from 5% to 35% and more preferably from 10% to 30% (by mass).

After the sulfonation reaction, the product of interest may be collected, for example by pouring it into cold water so as to make it precipitate. It may be washed with cold water to remove the excess acid, and dried.

The above reactions make it possible to graft sulfonic acid groups onto the molecules.

It is then possible to convert all or some of these sulfonic acid groups into sulfonate groups, by placing in contact with a base, such as sodium hydroxide or potassium hydroxide (neutralization reaction).

The temperature at which the neutralization reaction is performed may notably be from 5 to 95° C., preferably from 50 to 80° C. The reaction time may notably be from 1 to 50 hours, preferably from 1 to 8 hours. The sulfonated PAEK concentration in the basic solution may notably be from 5% to 50% by weight and preferably from 10% to 30% by weight.

The sulfonated PAEK may be characterized by its degree of sulfonation. The degree of sulfonation corresponds to the mean number of sulfonated groups per repeating unit in the polymer. The higher the degree of sulfonation, the more water-soluble the sulfonated PAEK. The solubility also depends notably on the nature of the PAEK, on its molar mass and on its crystallinity. It is generally desirable to use the minimum degree of sulfonation that makes it possible to dissolve the sulfonated PAEK in water.

Depending on the nature of the PAEK and depending on the degree of sulfonation, certain sulfonated PAEKs are water-soluble at room temperature, others only at higher temperature, for example 30 or 40 or 50° C.

Preferably, the sulfonated PAEK is water-soluble at room temperature (20° C.), which facilitates the management of the impregnation bath and avoids loss of water leading to a variation in the viscosity of the bath.

The degree of sulfonation may be controlled by modifying the conditions of the sulfonation reaction, notably the reaction time, the temperature and the concentration of sulfonate ions.

The articles Sulfonated Poly(aryl ether ketone)s by Ulrich and Rafler in *Die Angewandte Makromolekulare Chemie* 263: 71-78 (1998) and *Sulfonated Poly(ether ketone ketone) Ionomers as Proton Exchange Membranes* by Swier et al. in *Polymer Engineering and Science*, DOI 10.1002/pen.20361 (2005) describe examples of sulfonation of PAEK and also possible adjustment of the reaction conditions.

The degree of sulfonation may be determined by acid-base titration, for example with sodium hydroxide. By way of example, a test sample of 1 to 2 g of sulfonated PAEK may be taken, dissolved in 60 mL of pure water (for example of HPLC grade) with stirring, for example for 15 minutes, and then performing an assay with 0.01 N sodium hydroxide.

The degree of sulfonation of the sulfonated PAEK may notably be from 0.01 to 0.05; or from 0.05 to 0.1; or from 0.1 to 0.2; or from 0.2 to 0.5; or from 0.5 to 1; or from 1 to 2; or from 2 to 3; or from 3 to 4. Ranges from 0.1 to 1 and from 0.1 to 0.5 may be particularly suitable.

The degree of neutralization of the sulfonated groups corresponds to the molar proportion of sulfonate groups relative to the total amount of sulfonated groups.

The degree of neutralization may be controlled by modifying the amount of base placed in contact with the sulfonated PAEK. Preferably, a stoichiometric or slightly less than stoichiometric (0.98 equivalent) amount of base is used, relative to the sulfonated groups.

The degree of neutralization may be determined by titration by assaying the residual acidity with sodium hydroxide.

Preferably, the degree of neutralization of the sulfonated PAEK is from 50% to 100%, more preferably from 75% to 100% and more preferably from 95% to 100%.

Neutralization makes it possible to limit the degradation of the PAEK resin by the sulfonated PAEK.

The mixtures of different sulfonated PAEKs are considered in the present description as a sulfonated PAEK.

The present inventors moreover discovered that the sulfonation of the PAEKs described above may be applied in exactly the same manner to a non-polymeric aryl ether ketone. It is in particular thus possible to manufacture sulfonated 1,4-bis(4-phenoxybenzoyl)benzene.

By way of example, this 1,4-bis(4-phenoxybenzoyl)benzene may correspond to formula (XII) below:

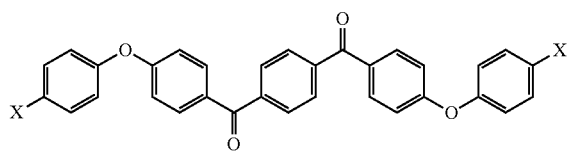

(XII)

in which each X independently represents a hydrogen atom or a sulfonated group, at least one of the two Xs representing a sulfonated group.

Preferably, each X represents a sulfonated group.

Resin Powder Suspension

According to the invention, a composition is prepared by adding the PAEK resin powder to an aqueous solution so as to form a suspension or dispersion.

The term "suspension" or "dispersion" means a heterogeneous composition including a liquid phase and a solid phase. The liquid phase is aqueous and contains the sulfonated PAEK or the sulfonated non-polymeric aryl ether ketone, and also other additives, where appropriate. The solid phase comprises or consists essentially of the PAEK resin powder.

In order to ensure the optimum homogeneity of the suspension and good subsequent impregnation of the fibers, it is preferred for the resin powder to be finely divided. More specifically, it is preferred for the PAEK resin powder to have a median diameter Dv50 ranging from 1 to 300 µm, preferably from 5 to 100 µm and most particularly from 10 to 50 µm, as measured according to the standard ISO 13 320.

Preferably, the content of PAEK resin powder or of sulfonated non-polymeric aryl ether ketone in this composition is from 1% to 50%, preferably from 10% to 40% and most particularly from 25% to 35% by weight (relative to the weight of the total composition).

The sulfonated PAEK or the sulfonated non-polymeric aryl ether ketone is used as dispersant or surfactant in the composition. The sulfonated PAEK or the sulfonated non-polymeric aryl ether ketone is present in the aqueous phase of the composition.

In certain embodiments, the mass proportion of sulfonated PAEK or of sulfonated non-polymeric aryl ether ketone, relative to the sum of the sulfonated PAEK and of the PAEK resin or, respectively, relative to the sum of the sulfonated non-polymeric aryl ether ketone and of the PAEK resin, is from 0.1% to 0.2%; or from 0.2% to 0.5%; or from 0.5% to 1%; or from 1% to 2%; or from 1% to 5%; or from 5% to 10%. A range from 0.5% to 5% is particularly suitable.

The optimum mass proportion may be chosen as a function of the amount of powder to be dispersed, its particle size and its surface appearance.

The sulfonated PAEK may or may not be of the same nature as the PAEK of the resin.

The aqueous phase of the composition may optionally comprise one or more surfactants other than the sulfonated PAEK or the sulfonated non-polymeric aryl ether ketone. It is, however, preferred for no other surfactant to be present to ensure the dispersion function.

The term "use as a dispersant" means that the sulfonated PAEK or the sulfonated non-polymeric aryl ether ketone makes it possible to improve the dispersion of the PAEK resin powder in the aqueous solution, and more particularly to reduce the dispersion time. Thus, when an amount of 20% by weight, relative to the weight of the finished dispersion of PAEK powder having a mean Dv50 of 20 µm is introduced into an aqueous solution of sulfonated PAEK of 25° C., or into an aqueous solution of sulfonated non-polymeric aryl ether ketone of 25° C., and when this powder is dispersed in the solution with moderate stirring, the presence of the sulfonated PAEK or, respectively, of the sulfonated non-polymeric aryl ether ketone makes it possible to obtain a homogeneous dispersion in a time of less than 3 hours, preferably less than 2 hours, whereas, under the same conditions but in the absence of sulfonated PAEK or, respectively, in the absence of sulfonated non-polymeric aryl ether ketone, no homogeneous dispersion is obtained.

The aqueous phase of the dispersion may, if necessary, include other additives such as thickeners, antifoams or biocidal agents. Preferably, in order to limit the presence of additives in the semifinished products and the associated potential problems, the total amount of other additives does not exceed 4% by weight, in particular 3% and most particularly 2% by weight or even 1% by weight of the total composition.

More preferably, the aqueous phase of the dispersion does not include any other additives, and in particular no thickeners.

The aqueous phase of the dispersion consists predominantly of water. The aqueous phase of the dispersion includes at least 60%, preferably 70%, more preferably at least 80% and most particularly at least 90% by weight of water. The water used to prepare the dispersion is preferably a demineralized water.

The dispersion, and more particularly the aqueous phase thereof, may also include one or more volatile organic compounds.

The term "volatile organic compound" means a compound containing at least the element carbon and one or more elements chosen from hydrogen, halogens, oxygen, sulfur, phosphorus, silicon and nitrogen, with the exception of carbon oxides and carbonates and bicarbonates, the compound having a boiling point at atmospheric pressure of less than 200° C., and preferably less than 150° C., more preferably less than 120° C. and most particularly less than 100° C.

These volatile organic compounds, which are water-soluble under the conditions of use, may notably be chosen from the families of alcohols, ketones, aldehydes, carboxylic acid esters, glycols and ethers.

In certain embodiments, use is made as volatile organic compound of an alcohol chosen from ethanol, isopropanol, n-propanol, n-butanol, 2-butanol, tert-butanol, 1-methoxy-2-propanol and 1-ethoxy-2-propanol, and mixtures thereof, a glycol chosen from ethylene glycol and propylene glycol, and mixtures thereof, a chosen ketone such as acetone, an ether, or else a carboxylic acid ester chosen from methyl acetate, ethyl acetate and propyl acetate, and mixtures thereof.

Particularly preferred are the volatile organic compounds that form an azeotrope with water, facilitating their removal, such as ethanol, methyl acetate, propyl acetate and mixtures thereof.

The addition of such volatile organic compounds to the aqueous phase may make it possible to reduce the surfactant content required to stabilize the PAEK resin in the dispersion and/or to increase the viscosity of the dispersion while ensuring better wetting of the dispersed particles. Their volatility ensures that they do not remain in the resin, unlike customary nonvolatile additives which then risk being decomposed into reactive species during the melting of the resin.

The aqueous phase of the dispersion may preferably include from 0% to 50%, more preferably from 1% to 40%, or from 5% to 30% or from 10% to 25% by weight of one or more volatile compounds. The content of these compounds is adjusted to avoid the precipitation of the surfactant.

The dispersion obtained preferably has a dynamic viscosity, as measured at 25° C. under a shear stress of $6.8 \text{ s}^{-1}$ on a Brookfield DVT2T Extra viscometer, of from 0.1 Pa·s to 20 Pa·s, in particular from 0.1 to 5 Pa·s, in particular from 0.3 to 3 Pa·s and most particularly from 0.5 to 2 Pa·s.

The dispersion may be prepared in a manner known per se. It is possible, for example, to prepare it by introducing, into a container of suitable volume equipped with a suitable stirring device, the required amount of water and then subsequently adding the dispersant and also the other additive(s), where appropriate. If necessary, the mixture is stirred until a homogeneous solution is obtained. The PAEK resin powder is subsequently introduced into the aqueous solution, which is then stirred until a stable dispersion is obtained.

The additions and mixings for preparing the dispersion may notably be performed at a temperature of from 10 to 95° C., preferably from 20 to 60° C. The choice of a suitable temperature may notably be made as a function of the solubility of the sulfonated PAEK or of the sulfonated non-polymeric aryl ether ketone in water. It is preferable to use a relatively high temperature if the sulfonated PAEK or, respectively, the sulfonated non-polymeric aryl ether ketone is relatively water-insoluble, whereas a lower temperature and notably room temperature may be suitable for use if the solubility of the sulfonated PAEK or, respectively, the sulfonated non-polymeric aryl ether ketone in water is high.

Process for Preparing a Semifinished Product

The term "semifinished product" means a product comprising a resin and reinforcing fibers, which is used as an intermediate product in the manufacture of composite materials. The semifinished products may notably be prepregs in the form of unidirectional sheets, of rovings or of woven fabrics, or else fiber/matrix mixtures.

The reinforcing fibers used for manufacturing the semifinished products may be chosen from any fibers which are able to be used as reinforcement in the manufacture of parts made of composite materials.

Thus, they may notably be glass fibers, quartz fibers, carbon fibers, graphite fibers, silica fibers, metal fibers, such as steel fibers, aluminum fibers or boron fibers, ceramic fibers, such as silicon carbide or boron carbide fibers, synthetic organic fibers, such as aramid fibers or poly(p-phenylene benzobisoxazole) fibers, better known under the acronym PBO, or else PAEK fibers, or else mixtures of such fibers.

Preferably, they are carbon fibers or glass fibers, and more particularly carbon fibers.

The fibers are preferably nonsized. When they are sized, the size is preferably suitable for the matrix, notably in that it does not produce degradation products detrimental to the matrix.

The reinforcing fibers used are generally continuous.

Preferably, they are present in the form of unidirectional fibers, for example in the form of yarns bringing together several thousand individual filaments (typically from 3000 to 48 000), measuring, for example, from 6 to 10 μm in diameter for the carbon fibers. Fibers of this type are known under the name of rovings.

Nevertheless, the fibers may also be arranged in a different way, for example in the form of a mat, or else in the form of textiles obtained by the weaving of rovings.

The semifinished products according to the invention may be manufactured conventionally, by employing the dispersion as described above.

More specifically, they may be obtained by introducing and circulating the reinforcing fibers in a bath of dispersion as described above. The fibers impregnated with PAEK resin powder are subsequently removed from the bath and stripped of the water, for example by drying in an infrared oven. The dried impregnated fibers are subsequently heated until the resin has melted, so as to allow the coating of the fibers with the PAEK resin. The coated fibers obtained are subsequently, where appropriate, formed, for example by calendering. This step may make it possible to texture and ensure the proportioning of the semifinished product.

Preferably, the semifinished products according to the invention include from 1% to 99% by weight, preferably from 30% to 90%, in particular from 50% to 80% by weight and in particular from 60% to 70% by weight of reinforcing fibers.

The semifinished products obtained according to this may notably be used for the manufacture of composite parts.

The composite parts are obtained, for example, by first manufacturing a preform, notably by placing or drape forming the pre-impregnated semifinished products in a mold. The composite part is then obtained by consolidation, during which step the preform is heated, generally under pressure in an autoclave, so as to assemble the semifinished products by melting. Preferably, the semifinished products manufactured according to the invention may be consolidated outside the autoclave, for example in a vacuum bag placed in an oven.

The semifinished products manufactured according to the process of the invention are characterized in particular by a resin, the viscosity of which changes little despite the high temperatures required for their manufacture in order to melt the resin.

In the processes for manufacturing composite parts, the semifinished products are subjected to various thermal cycles, under pressure or under vacuum, in order to assemble them together in order to form the composite part and/or to form its shape.

The composite products manufactured according to the process of the invention are characterized in particular by a resin, the viscosity of which has changed little despite the high temperatures required for their manufacture.

During these steps, it is important for the viscosity of the matrix not to be too high, so as to ensure that the semifinished products do indeed adopt the shapes of the mold. The viscosity of the matrix also makes it possible to ensure good flow during the consolidation and to thus prevent surface defects such as creases.

The semifinished products may subsequently be assembled, for example by manual or automated drape forming or by automated placement, and formed into shape by consolidation, for the manufacture of composite parts. The composite parts thus manufactured may be further converted, in order to obtain assemblies of complex composite parts. Thus, it is possible to co-consolidate composite parts, this process generally being performed in an autoclave by means of a fresh thermal cycle, or to weld parts to one another by local heating.

EXAMPLES

The examples that follow illustrate the invention without limiting it.

Example 1—Preparation of a Non-Neutralized S-PEKK

A PEKK produced by Arkema, of reference Kepstan® 6004 PF (10 g), having an MVI (melt volume index) of 23.4 cm$^3$/10 min (at 380° C. under a 1 kg load) and ClSO$_3$H (38.8 g) are placed in contact at 0° C. The mixture is then stirred vigorously and heated at 50° C. for 6 hours. The mixture is then cooled to 0° C. and dichloromethane (50 mL) is added to fluidize the mixture. The excess acid is then quenched with water (100 mL). A solid forms, and is filtered off and washed thoroughly with water to remove the residual acid. Finally, the solid is dried in a vacuum oven for 2 hours at 120° C.

By acid-base assay with sodium hydroxide, a degree of sulfonation of 0.38 is determined.

Example 2—Preparation of a Non-Neutralized S-oPEKK

A PEKK oligomer (10 g) of molecular mass 2600 g/mol is sulfonated under the conditions of example 1.

By assay with sodium hydroxide, a degree of sulfonation of 0.21 is determined.

The same protocol may be used with 1,4-bis(4-phenoxybenzoyl)benzene. It should be noted that, at room temperature, the sulfonated 1,4-bis(4-phenoxybenzoyl)benzene with a degree of sulfonation of 2 is not water-soluble but is dispersible in water with stirring.

Example 3—Preparation of a Neutralized Sulfonated S-oPEKK-Na Oligomer

Starting with the product of example 2, the degree of sulfonation is determined by acid-base assay, and the neutralized sulfonated PEKK is prepared by reacting the sulfonated oligomer with one equivalent of sodium hydroxide relative to the sulfonic functions, in refluxing water.

Example 4—Preparation of a Non-Neutralized S-PEEK

A PEEK produced by Victrex (150G grade, 10 g), having an MVI (melt volume index) of 49 cm$^3$/10 min (at 380° C. under a 5 kg load) and ClSO$_3$H (38.8 g) are placed in contact at 0° C. The mixture is then stirred vigorously and heated at 50° C. for 6 hours. The mixture is then cooled to 0° C. and dichloromethane (50 mL) is added to fluidize the mixture. The excess acid is then quenched with water (100 mL). A solid forms, and is filtered off and washed thoroughly with water to remove the residual acid. Finally, the solid is dried in a vacuum oven for 2 hours at 120° C.

By acid-base assay with sodium hydroxide, a degree of sulfonation of 1.13 is determined.

Example 5—Preparation of a Neutralized S-PEEK

Starting with the product of example 4, the degree of sulfonation is determined by acid-base assay, and the neutralized sulfonated PEEK is prepared by reacting it with one equivalent of sodium hydroxide relative to the sulfonic functions, in refluxing water.

Example 6—Dispersion and Thermal Stability Properties

PEKK powder dispersions were prepared. The PEKK used is supplied by Arkema under the reference 7002 PT. The Dv50 of the powder is about 20 µm.

The following mixtures were thus prepared, and then heated to reflux:
  A (comparative): PEKK 7002PT (1 g)+water (9 g).
  B (comparative): surfactant Brij® S100 from Sigma-Aldrich (0.01 g)+PEKK 7002PT (0.99 g)+water (9 g).

C: S-oPEKK (0.01 g)+PEKK 7002PT (0.99 g)+water (9 g).
D: S-oPEKK (0.05 g)+PEKK 7002PT (0.95 g)+water (9 g).
E: S-oPEKK Na (0.05 g)+PEKK 7002PT (0.95 g)+water (9 g).
F: S-PEEK (0.05 g)+PEKK 7002PT (0.95 g)+water (9 g).
G: S-PEEK Na (0.05 g)+PEKK 7002PT (0.95 g)+water (9 g).

The quality of the dispersions was studied visually, in a pill bottle. A dispersion is judged to be good if the mixture is fluid and if little or no PEKK powder attaches to the walls of the pill bottle (out of liquid phase) after stirring. It is judged to be mediocre if the mixture is fluid but if an appreciable amount of PEKK powder attaches to the walls of the pill bottle (out of liquid phase) after stirring. A dispersion is considered to have not been obtained if the mixture is thick and if demixing is observed, with the presence of unwetted PEKK residues. It should be noted that the dispersion time is less than 2 hours when the aqueous solution contains 1% by weight of sulfonated PAEK and less than 1 hour when it contains 5% by weight of sulfonated PAEK.

Next, the water of the samples was evaporated off on a rotary evaporator and the solids obtained were dried under vacuum at 120° C. for 2 hours. The crystallization temperature of each material after 30 minutes at 380° C. was then measured. This temperature is, in point of fact, affected by the structural changes of the PEKK.

A decrease in this temperature is explained either by substantial chemical changes in the polymer or by chain-elongation reactions associated, for example, with branching phenomena.

The results are summarized in the table below:

| Sample | Quality of the dispersion | Crystallization temperature |
|---|---|---|
| A | No dispersion | 269° C. |
| B | Good dispersion | 250° C. |
| C | Mediocre dispersion | 270° C. |
| D | Good dispersion | 259° C. |
| E | Good dispersion | 268° C. |
| F | Good dispersion | Amorphous |
| G | Good dispersion | 263° C. |

It is moreover found that a PEKK impregnated by means of a dispersion comprising one of the sulfonated PAEKs prepared as dispersant has thermal stability that is superior to that of the PEKK impregnated with 1% of commercial surfactant.

The invention claimed is:

1. A method comprising dispersing a polyaryl ether ketone resin powder in an aqueous solution with a sulfonated polyaryl ether ketone.

2. The method as claimed in claim 1, in which the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same.

3. The method as claimed in claim 1, in which the sulfonated polyaryl ether ketone is chosen from the group consisting of sulfonated polyether ketones (PEK), sulfonated polyether ether ketones (PEEK), sulfonated polyether ether ketone ketones (PEEKK), sulfonated polyether ketone ketones (PEKK), sulfonated polyether ketone ether ketone ketones (PEKEKK), sulfonated polyether ether ketone ether ketones (PEEKEK), sulfonated polyether ether ether ketones (PEEEK), sulfonated polyether diphenyl ether ketones (PEDEK), mixtures thereof and copolymers comprising same.

4. The method as claimed in claim 1, in which the sulfonated polyaryl ether ketone has a degree of sulfonation of from 0.01 to 4.

5. The method as claimed in claim 1, in which the sulfonated polyaryl ether ketone includes sulfonated groups chosen from sulfonic acid groups and/or sulfonate groups, the molar proportion of sulfonate groups in the sulfonated polyaryl ether ketone, relative to the total amount of sulfonated groups, being greater than or equal to 50%.

6. A composition comprising a polyaryl ether ketone resin powder suspended in an aqueous solution, the composition also comprising a sulfonated polyaryl ether ketone.

7. The composition as claimed in claim 6, in which the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same.

8. The composition as claimed in claim 6, in which the sulfonated polyaryl ether ketone is chosen from the group consisting of sulfonated polyether ketones (PEK), sulfonated polyether ether ketones (PEEK), sulfonated polyether ether ketone ketones (PEEKK), sulfonated polyether ketone ketones (PEKK), sulfonated polyether ketone ether ketone ketones (PEKEKK), sulfonated polyether ether ketone ether ketones (PEEKEK), sulfonated polyether ether ether ketones (PEEEK), sulfonated polyether diphenyl ether ketones (PEDEK), mixtures thereof and copolymers comprising same.

9. The composition as claimed in claim 6, in which the sulfonated polyaryl ether ketone has a degree of sulfonation of from 0.01 to 4.

10. The composition as claimed in claim 6, in which the sulfonated polyaryl ether ketone includes sulfonated groups chosen from sulfonic acid groups and/or sulfonate groups, the molar proportion of sulfonate groups in the sulfonated polyaryl ether ketone, relative to the total amount of sulfonated groups, being greater than or equal to 50%.

11. The composition as claimed in claim 6, in which the mass content of sulfonated polyaryl ether ketone, relative to the polyaryl ether ketone resin powder, is from 0.1% to 20%.

12. A process for preparing a semifinished product comprising a polyaryl ether ketone resin and reinforcing fibers, comprising:
    the provision of a composition as claimed in claim 6, and the impregnation of reinforcing fibers with this composition;
    drying of the impregnated reinforcing fibers;
    heating of the impregnated reinforcing fibers so as to melt the polyaryl ether ketone; and
    optionally, a calendering step.

13. The preparation process as claimed in claim 12, in which the reinforcing fibers are carbon fibers.

14. The preparation process as claimed in claim 12, in which the semifinished product is chosen from a prepreg or a tape.

15. A semifinished product which is prepared according to the process of claim 12.

16. A process comprising manufacturing a composite material, the method comprising manufacturing with the semifinished product as claimed in claim 15.

17. A method comprising dispersing a polyaryl ether ketone resin powder in an aqueous solution with a sulfonated non-polymeric aryl ether ketone.

18. The method as claimed in claim 17, in which the sulfonated non-polymeric aryl ether ketone is sulfonated 1,4-bis(4-phenoxybenzoyl)benzene.

19. The method as claimed in claim 17, in which the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same.

20. The method as claimed in claim 17, in which the sulfonated non-polymeric aryl ether ketone includes sulfonated groups chosen from sulfonic acid groups and/or sulfonate groups, the molar proportion of sulfonate groups in the sulfonated non-polymeric aryl ether ketone, relative to the total amount of sulfonated groups, being greater than or equal to 50%.

21. A composition comprising a polyaryl ether ketone resin powder suspended in an aqueous solution, the composition also comprising a sulfonated non-polymeric aryl ether ketone.

22. The composition as claimed in claim 21, in which the sulfonated non-polymeric aryl ether ketone is sulfonated 1,4-bis(4-phenoxybenzoyl)benzene.

23. The composition as claimed in claim 21, in which the polyaryl ether ketone is chosen from the group consisting of polyether ketones (PEK), polyether ether ketones (PEEK), polyether ether ketone ketones (PEEKK), polyether ketone ketones (PEKK), polyether ketone ether ketone ketones (PEKEKK), polyether ether ketone ether ketones (PEEKEK), polyether ether ether ketones (PEEEK), polyether diphenyl ether ketones (PEDEK), mixtures thereof and copolymers comprising same.

24. The composition as claimed in claim 21, in which the sulfonated non-polymeric aryl ether ketone includes sulfonated groups chosen from sulfonic acid groups and/or sulfonate groups, the molar proportion of sulfonate groups in the sulfonated non-polymeric aryl ether ketone, relative to the total amount of sulfonated groups, being greater than or equal to 50%.

25. The composition as claimed in claim 21, in which the mass content of sulfonated non-polymeric aryl ether ketone, relative to the polyaryl ether ketone resin powder, is from 0.1% to 20%.

26. A process for preparing a semifinished product comprising a polyaryl ether ketone resin and reinforcing fibers, comprising:
the provision of a composition as claimed in claim 21, and the impregnation of reinforcing fibers with this composition;
drying of the impregnated reinforcing fibers;
heating of the impregnated reinforcing fibers so as to melt the polyaryl ether ketone; and
optionally, a calendering step.

27. The preparation process as claimed in claim 26, in which the reinforcing fibers are carbon fibers.

28. The preparation process as claimed in claim 26, in which the semifinished product is chosen from a prepreg or a tape.

29. A semifinished product which is prepared according to the process of claim 26.

30. A process comprising manufacturing a composite material, the method comprising manufacturing with the semifinished product as claimed in claim 29.

\* \* \* \* \*